United States Patent
Vetter et al.

(10) Patent No.: US 8,202,581 B2
(45) Date of Patent: Jun. 19, 2012

(54) TREATMENT FOR CEMENT COMPOSITE ARTICLES

(75) Inventors: Glen O. Vetter, New Hope, MN (US); Larry L. Herfindal, Chisago City, MN (US); John W. Mittelsteadt, Lakeville, MN (US); Heidi M. Turner, Rosemount, MN (US); Andrew Ubel, Saint Paul, MN (US); Kevin W. Evanson, Maple Grove, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 1161 days.

(21) Appl. No.: 12/032,213

(22) Filed: Feb. 15, 2008

(65) Prior Publication Data

US 2008/0199725 A1    Aug. 21, 2008

Related U.S. Application Data

(60) Provisional application No. 60/890,450, filed on Feb. 16, 2007.

(51) Int. Cl.
*B05D 1/36* (2006.01)
*B05D 7/00* (2006.01)

(52) U.S. Cl. .................................................. 427/402
(58) Field of Classification Search .................. 427/402
See application file for complete search history.

(56) References Cited

U.S. PATENT DOCUMENTS

| | | | |
|---|---|---|---|
| 2,128,961 A | 9/1938 | Patterson | |
| 2,356,542 A | 8/1944 | Sloan | |
| 2,633,458 A | 3/1953 | Shokal | |
| 2,674,775 A | 4/1954 | Wilson | |
| 2,727,012 A | 12/1955 | Treat et al. | |
| 2,730,517 A | 1/1956 | Vogel et al. | |
| 3,010,919 A | 11/1961 | Mackinney et al. | |
| 3,049,458 A | 8/1962 | Willard | |
| 3,091,551 A | 5/1963 | Robertson | |
| 3,219,467 A | 11/1965 | Redican et al. | |
| 3,380,831 A | 4/1968 | Cohen et al. | |
| 3,449,161 A | 6/1969 | Hindersinn et al. | |
| 3,655,423 A | 4/1972 | Lin et al. | |

(Continued)

FOREIGN PATENT DOCUMENTS

AU    198060655 A1    3/1981

(Continued)

OTHER PUBLICATIONS

Hardie Siding Painting Tips, Paint Manufacturers' Recommendation Sheet—No. S-100, Dec. 2005; found at http://web.archive.org/web/20051225044804/http://www.jameshardie.com/homeowner/technical/paintingtips.php.*

(Continued)

*Primary Examiner* — Michael Cleveland
*Assistant Examiner* — James M Mellott
(74) *Attorney, Agent, or Firm* — IPLM Group, P.A.

(57) ABSTRACT

A cement fiberboard substrate is treated on at least one edge of the substrate with an aqueous solution containing at least one phosphorus acid or salt of a phosphorus acid. The treated edge is overcoated with a sealer, primer or topcoat. The resulting prefinished fiber cement siding product has improved coating adhesion, especially near burnished regions and near edges and corners proximate the burnished regions. A phosphorus acid or salt of a phosphorus acid also may be added to the sealer to provide further improvement in coating adhesion.

24 Claims, 1 Drawing Sheet

U.S. PATENT DOCUMENTS

| | | | |
|---|---|---|---|
| 3,781,396 A | 12/1973 | Okuda et al. | |
| 3,899,611 A | 8/1975 | Hall | |
| 3,935,173 A | 1/1976 | Ogasawara et al. | |
| 3,935,364 A | 1/1976 | Prokesh et al. | |
| 3,970,628 A | 7/1976 | Connelly et al. | |
| 4,015,040 A | 3/1977 | Yoshida et al. | |
| 4,028,294 A | 6/1977 | Brown et al. | |
| 4,113,893 A | 9/1978 | Hahn | |
| 4,132,526 A | 1/1979 | Schwarz et al. | |
| 4,197,389 A | 4/1980 | Becker et al. | |
| 4,211,848 A | 7/1980 | Blount | |
| 4,228,761 A | 10/1980 | Glover et al. | |
| 4,333,867 A | 6/1982 | Sauntson | |
| 4,385,152 A | 5/1983 | Boyack et al. | |
| 4,390,688 A | 6/1983 | Walz et al. | |
| 4,408,018 A | 10/1983 | Bartman et al. | |
| 4,486,553 A | 12/1984 | Wesch | |
| 4,522,962 A * | 6/1985 | Abbey et al. | 523/410 |
| 4,536,534 A | 8/1985 | Singer et al. | |
| 4,582,755 A | 4/1986 | Dietrich | |
| 4,598,108 A | 7/1986 | Hoefs | |
| 4,719,149 A | 1/1988 | Aasen et al. | |
| 4,742,121 A | 5/1988 | Toman | |
| 4,822,828 A | 4/1989 | Swofford | |
| 4,852,316 A | 8/1989 | Webb | |
| 4,880,660 A | 11/1989 | Aasen et al. | |
| 4,886,852 A | 12/1989 | Numa | |
| 4,904,522 A | 2/1990 | Markusch | |
| 4,908,229 A | 3/1990 | Kissel | |
| 4,916,004 A | 4/1990 | Ensminger et al. | |
| 5,017,632 A | 5/1991 | Bredow et al. | |
| 5,073,578 A | 12/1991 | Boodaghains et al. | |
| 5,075,370 A | 12/1991 | Kubitza et al. | |
| 5,100,948 A | 3/1992 | Aydin et al. | |
| 5,157,074 A | 10/1992 | Metzger et al. | |
| 5,191,012 A | 3/1993 | Markusch et al. | |
| 5,212,230 A | 5/1993 | Tirpak et al. | |
| 5,221,710 A | 6/1993 | Markusch et al. | |
| 5,236,994 A | 8/1993 | Markusch et al. | |
| 5,262,444 A | 11/1993 | Rusincovitch et al. | |
| 5,296,530 A | 3/1994 | Bors et al. | |
| 5,356,716 A | 10/1994 | Patel | |
| 5,371,148 A | 12/1994 | Taylor et al. | |
| 5,407,783 A | 4/1995 | Caruso | |
| 5,409,984 A | 4/1995 | Gerhardinger | |
| 5,418,264 A | 5/1995 | Obloh et al. | |
| 5,426,142 A | 6/1995 | Rosano et al. | |
| 5,461,125 A | 10/1995 | Lu et al. | |
| 5,468,804 A | 11/1995 | Schmalstieg et al. | |
| 5,478,601 A | 12/1995 | Larson et al. | |
| 5,484,849 A | 1/1996 | Bors et al. | |
| 5,500,457 A | 3/1996 | Sarkar et al. | |
| 5,534,310 A | 7/1996 | Rokoski et al. | |
| 5,559,192 A | 9/1996 | Bors et al. | |
| 5,562,953 A | 10/1996 | Bors et al. | |
| 5,567,767 A | 10/1996 | Smeal et al. | |
| 5,569,686 A | 10/1996 | Makati et al. | |
| 5,571,863 A | 11/1996 | Smeal et al. | |
| 5,672,379 A | 9/1997 | Schall et al. | |
| 5,681,385 A | 10/1997 | Beckenhauer | |
| 5,688,867 A | 11/1997 | Scheibelhoffer et al. | |
| 5,708,077 A | 1/1998 | Nölken et al. | |
| 5,708,093 A | 1/1998 | Bastelberger et al. | |
| 5,718,943 A | 2/1998 | Hsu et al. | |
| 5,766,768 A | 6/1998 | Cummings et al. | |
| 5,777,053 A | 7/1998 | McBain et al. | |
| 5,780,117 A | 7/1998 | Swartz et al. | |
| 5,798,426 A | 8/1998 | Anton et al. | |
| 5,814,397 A | 9/1998 | Cagliostro et al. | |
| 5,869,590 A * | 2/1999 | Clark et al. | 526/323 |
| 5,874,503 A | 2/1999 | Scheibelhoffer et al. | |
| 5,928,778 A | 7/1999 | Takahashi et al. | |
| 5,945,044 A | 8/1999 | Kawai et al. | |
| 5,962,571 A | 10/1999 | Overbeck et al. | |
| 5,973,068 A | 10/1999 | Yamaya et al. | |
| 5,994,428 A | 11/1999 | Lutz et al. | |
| 5,997,952 A * | 12/1999 | Harris et al. | 427/302 |
| 6,007,619 A | 12/1999 | Laas et al. | |
| 6,008,289 A | 12/1999 | König et al. | |
| 6,011,078 A | 1/2000 | Reich et al. | |
| 6,030,447 A | 2/2000 | Naji et al. | |
| 6,045,871 A * | 4/2000 | Matt et al. | 427/388.4 |
| 6,045,873 A | 4/2000 | Adachi et al. | |
| 6,048,471 A | 4/2000 | Henry | |
| 6,063,864 A | 5/2000 | Mathur et al. | |
| 6,103,352 A | 8/2000 | Takahashi | |
| 6,114,440 A | 9/2000 | Yamaya et al. | |
| 6,136,383 A | 10/2000 | Schwartz et al. | |
| 6,146,710 A | 11/2000 | Symons | |
| 6,162,511 A | 12/2000 | Garnett et al. | |
| 6,235,228 B1 | 5/2001 | Nicholl et al. | |
| 6,297,320 B1 | 10/2001 | Tang et al. | |
| 6,346,146 B1 | 2/2002 | Duselis et al. | |
| 6,395,827 B1 | 5/2002 | Pears et al. | |
| 6,398,976 B1 | 6/2002 | Sandoval et al. | |
| 6,417,267 B1 | 7/2002 | Stockl et al. | |
| 6,426,414 B1 | 7/2002 | Laas et al. | |
| 6,453,960 B1 | 9/2002 | Kondo et al. | |
| 6,458,250 B1 | 10/2002 | Holliday et al. | |
| 6,475,556 B1 | 11/2002 | Sobczak et al. | |
| 6,485,601 B1 | 11/2002 | Egan et al. | |
| 6,485,793 B1 | 11/2002 | Ott et al. | |
| 6,492,450 B1 | 12/2002 | Hsu | |
| 6,506,248 B1 | 1/2003 | Duselis et al. | |
| 6,534,176 B2 | 3/2003 | Terase et al. | |
| 6,555,625 B1 | 4/2003 | Overbeek et al. | |
| 6,590,025 B1 | 7/2003 | Carlson et al. | |
| 6,635,735 B1 | 10/2003 | Zhang et al. | |
| 6,638,567 B1 | 10/2003 | Beisele | |
| 6,641,629 B2 | 11/2003 | Safta et al. | |
| 6,641,658 B1 | 11/2003 | Dubey | |
| 6,649,679 B1 | 11/2003 | Stockl et al. | |
| 6,660,386 B2 | 12/2003 | Haque | |
| 6,696,518 B1 | 2/2004 | Dersch et al. | |
| 6,740,423 B2 | 5/2004 | Murase | |
| 6,753,394 B2 | 6/2004 | Weikard et al. | |
| 6,762,230 B2 | 7/2004 | Brandenburger et al. | |
| 6,818,697 B2 | 11/2004 | Zhang et al. | |
| 6,849,338 B2 | 2/2005 | Clemens et al. | |
| 6,893,751 B2 | 5/2005 | Naji et al. | |
| 6,941,720 B2 | 9/2005 | DeFord et al. | |
| 6,998,012 B2 | 2/2006 | Koelliker et al. | |
| 7,049,352 B2 | 5/2006 | Gould et al. | |
| 7,101,921 B2 | 9/2006 | Edwards et al. | |
| 7,105,593 B2 | 9/2006 | Solomon et al. | |
| 7,148,270 B2 | 12/2006 | Bowe | |
| 7,235,595 B2 | 6/2007 | Hermes et al. | |
| 7,235,603 B2 | 6/2007 | Madle et al. | |
| 7,238,391 B2 | 7/2007 | Dargontina et al. | |
| 7,247,671 B2 | 7/2007 | Overbeek et al. | |
| 7,265,166 B2 | 9/2007 | Gebhard et al. | |
| 7,338,989 B2 | 3/2008 | Gross et al. | |
| 7,381,785 B2 | 6/2008 | Detrembleur et al. | |
| 7,449,516 B2 | 11/2008 | Bayer et al. | |
| 7,758,954 B2 | 7/2010 | Nguyen et al. | |
| 2002/0007009 A1 | 1/2002 | Stark et al. | |
| 2002/0009622 A1 | 1/2002 | Goodson | |
| 2002/0081437 A1 | 6/2002 | Dargontina et al. | |
| 2002/0179240 A1 | 12/2002 | Clemens et al. | |
| 2002/0195191 A1 | 12/2002 | Weiss et al. | |
| 2003/0027915 A1 | 2/2003 | Gerst et al. | |
| 2003/0055171 A1 | 3/2003 | Overbeek et al. | |
| 2003/0073778 A1 | 4/2003 | Zhang et al. | |
| 2003/0089061 A1 | 5/2003 | DeFord et al. | |
| 2003/0150359 A1 | 8/2003 | Lassmann | |
| 2003/0153673 A1 | 8/2003 | Schwalm et al. | |
| 2003/0203991 A1 | 10/2003 | Schottman et al. | |
| 2003/0207121 A1 | 11/2003 | McGee | |
| 2003/0224184 A1 | 12/2003 | Hermes et al. | |
| 2004/0002559 A1 | 1/2004 | Troutman et al. | |
| 2004/0044094 A1 | 3/2004 | Garnett | |
| 2004/0077782 A1 | 4/2004 | Heldmann et al. | |
| 2004/0082715 A1 | 4/2004 | Bayer et al. | |
| 2004/0086676 A1 | 5/2004 | Peng | |
| 2004/0161542 A1 | 8/2004 | Ziemann et al. | |
| 2004/0176502 A1 | 9/2004 | Raymond et al. | |
| 2004/0198903 A1 * | 10/2004 | Madle et al. | 524/800 |

| | | |
|---|---|---|
| 2004/0229978 A1 | 11/2004 | Bowe |
| 2005/0009954 A1 | 1/2005 | Gebhard et al. |
| 2005/0027079 A1 | 2/2005 | Palmer Lauer et al. |
| 2005/0053797 A1 | 3/2005 | Rumph et al. |
| 2005/0126430 A1* | 6/2005 | Lightner et al. ............ 106/15.05 |
| 2005/0176321 A1 | 8/2005 | Crette et al. |
| 2005/0203211 A1 | 9/2005 | Gebhard |
| 2005/0208285 A1 | 9/2005 | Lyons et al. |
| 2006/0013950 A1 | 1/2006 | Porter et al. |
| 2006/0024480 A1 | 2/2006 | Lyons et al. |
| 2006/0046068 A1 | 3/2006 | Barancyk et al. |
| 2006/0048708 A1 | 3/2006 | Hartig |
| 2006/0111503 A1 | 5/2006 | Killilea et al. |
| 2006/0135684 A1 | 6/2006 | Killilea |
| 2006/0135686 A1 | 6/2006 | Killilea et al. |
| 2006/0182946 A1 | 8/2006 | Zarb et al. |
| 2006/0288909 A1 | 12/2006 | Naji et al. |
| 2007/0042192 A1 | 2/2007 | Nguyen et al. |
| 2007/0110981 A1 | 5/2007 | Killilea et al. |
| 2007/0149077 A1 | 6/2007 | Stanislawczyk et al. |
| 2007/0213445 A1 | 9/2007 | Klijn et al. |
| 2007/0259166 A1 | 11/2007 | Killilea et al. |
| 2007/0259188 A1 | 11/2007 | Wu et al. |
| 2007/0269660 A1 | 11/2007 | Killilea et al. |
| 2007/0282046 A1 | 12/2007 | Killilea et al. |
| 2008/0008895 A1 | 1/2008 | Garner et al. |
| 2008/0139737 A1 | 6/2008 | Alderfer et al. |
| 2008/0141908 A1 | 6/2008 | Peng et al. |

FOREIGN PATENT DOCUMENTS

| | | |
|---|---|---|
| AU | 2005 00347 B4 | 5/2005 |
| DE | 33 02 767 A1 | 8/1984 |
| EP | 0 060 505 A1 | 9/1982 |
| EP | 486 278 A1 | 5/1992 |
| EP | 0 623 659 A2 | 11/1994 |
| EP | 0 640 629 A1 | 3/1995 |
| EP | 0 697 417 A1 | 2/1996 |
| EP | 0 705 855 A2 | 4/1996 |
| EP | 0 725 088 A1 | 8/1996 |
| EP | 0 728 779 B2 | 8/1996 |
| EP | 0 757 059 A1 | 2/1997 |
| EP | 0 894 780 A1 | 2/1999 |
| EP | 1 118 632 A2 | 7/2001 |
| EP | 1 170 340 A1 | 1/2002 |
| EP | 1 454 935 A1 | 9/2004 |
| EP | 1 473 331 A1 | 11/2004 |
| EP | 1 505 088 A1 | 2/2005 |
| EP | 1 505 127 A1 | 2/2005 |
| EP | 1 589 083 A2 | 10/2005 |
| EP | 1 650 045 A2 | 4/2006 |
| EP | 1 798 258 A1 | 6/2007 |
| GB | 1 407 827 | 9/1975 |
| JP | 54 038323 | 3/1979 |
| JP | 01-229242 | 9/1989 |
| JP | 02 308887 | 12/1990 |
| JP | 08-059939 | 3/1996 |
| JP | 11 236281 | 8/1999 |
| JP | 03-44986 A | 12/2000 |
| JP | 2003 226835 A | 8/2003 |
| JP | 2003 251269 | 9/2003 |
| JP | 2004 010805 A | 1/2004 |
| JP | 2004 250607 A2 | 9/2004 |
| JP | 2004 292748 A2 | 10/2004 |
| JP | 2005 307161 A | 11/2005 |
| JP | 2006 117812 | 5/2006 |
| SU | 833892 | 5/1981 |
| WO | WO 94/07674 A1 | 4/1994 |
| WO | WO 94/25499 A1 | 11/1994 |
| WO | WO 98/45222 | 10/1998 |
| WO | WO 99/67312 | 12/1999 |
| WO | WO 00/23495 A1 | 4/2000 |
| WO | WO 00/56826 | 9/2000 |
| WO | WO 01/68547 A1 | 9/2001 |
| WO | WO 02/070623 A2 | 9/2002 |
| WO | WO 03/000761 A1 | 1/2003 |
| WO | WO 03/076536 A1 | 9/2003 |
| WO | WO 03/101918 A2 | 12/2003 |
| WO | WO 2005/071179 A1 | 8/2005 |
| WO | WO 2006/032512 A | 3/2006 |
| WO | WO 2006/065914 A1 | 6/2006 |
| WO | WO 2007/059516 A1 | 5/2007 |
| WO | WO 2007/087458 A1 | 8/2007 |
| WO | WO 2007/089807 A2 | 8/2007 |
| WO | WO 2007/089913 A1 | 8/2007 |
| WO | WO 2007/090132 A1 | 8/2007 |
| WO | WO 2008/018910 A2 | 2/2008 |

OTHER PUBLICATIONS

Hardiplank Lap Siding Installation, Dec. 2005, found at http://web.archive.org/web/20051215084041/http://www.jameshardie.com/homeowner/installation/hardiplank_installation.php.*
Hardiplank Lap Siding Installation, Dec. 2005, found at http://web.archive.org/web/20051215084041/http://www.jameshardie.com/homeowner/installation/hardiplank_intallation.php.*
Gardner's Commercially Important Chemicals, edited by G.W.A Milne, Wiley, 2005, p. 573.*
NaH2PO4 MSDS, found at http://muby.itgo.com/MSDS/sodium_phosphate_monobasic_anhyd%20MSDS.htm.*
NaH2PO4 MSDS, found at http://muby.itgo.com/MSDS/sodum_phosphate_monobasic_anhyd%20MSDS.htm—No Date Available.*
American Society of Testing Materials, ASTM Designation: D523-89 (Reapproved 1999), "Standard Test Method for Specular Gloss;" 5 pages.
American Society of Testing Materials, ASTM Designation: D5402-93 (Reapproved 1999), "Standard Practice for Assessing the Solvent Resistance of Organic Coatings Using Solvent Rubs;" 3 pages.
ASTM D6944-03, Test Method A (2003).
Wicks, Z.W. et al., *Epoxy and Phenolic Resins*, Organic Coatings Science and Technology, vol. 1, Chapter XI, pp. 162-187 (1992).
Witzeman, J. S. et al., *Comparison of Methods for the Preparation of Acetoacetylated Coating Resins*, Coatings Technology; vol. 62, No. 789, pp. 101-112 (Oct. 1990).
Clemens, R. J. et al., *A Comparison of Catalysts for Crosslinking Acetoacetylated Resins via the Michael Reaction*, Journal of Coatings Technology, vol. 61, No. 770, pp. 83-91 (Mar. 1989).
Clemens, R. J., *A Comparison of Catalysts for Crosslinking Acetoacetylated Resins via the Michael Reaction*, Water-Borne & Higher Solids Coatings Symposium, New Orleans, LA, 55-67 (1988).
Eastman Chemical Company, Publications N-319C, Kingport, TN., Title page, Table of Contents, "Acetoacetoxyethyl Methacrylate (AAEM) Acetoacetyl Chemistry," pp. 1-11 (Dec. 1999).
Lewis et al., "Luminescence", Hawley's Condensed Chemical Dictionary, 14th Ed., John Wiley and Sons, Inc., retrieved from Knovel® online; 1 page (2002).
"Photoinitiators for UV Curing," "Darocur 1173", p. 2; Ciba Specialty Chemicals; 8 pages (2003).
Tennebroek et al., *New Polymer Synthesis for (self) Crosslinkable Urethanes and Urethane Acrylics*, 4th Nürnberg Congress; International Centre for Coatings Technology, Paper 17, 19 pages (2000).
Geurts, J.M. et al., *Self-crosslinkable Urethanes and Urethane/Acrylics*, Verfkroniek Nummer (Jan. 1999).
Geon® Lo-Sope Dispersion Resin, Geon® 171 Vinyl Chloride Homopolymer Technical Data Sheet, PolyOne Corporation, 2 pages (May 2003).
Geon Copolymer Dispersion Resin Geon® 137 Vinyl Chloride Copolymer Technical Data Sheet, PolyOne Corporation, 2 pages (Apr. 1997).
Industrial Research Services, *Test Report No. 54703-1 for Epirez Safe Step 100*, CSIRO, Manuf. & Infrastr. Technology, Australia, pp. 1-6 (May 2004).
DSM NeoResins, Technical Data Sheet, DSM NeoResins Inc.,Bulletin XK-90, 6 pages (Jan. 2006).
Tex•Cote® Stretch Product Information, Textured Coatings of America, Inc., Panama City, Florida, 3 pages (Nov. 2003).
UCAR Emulsion Systems Applications, *Architectural Coatings-Exterior-Cement Fiber Board*, Dow Chemical Company product information sheet printed on Oct. 25, 2007 from the following internet archives website at: http://web.archive.org/web/20041022123748/http://www.dow.com/ucarlatex/app/arch/ex_fiber.htm.

Rector, F.D. et al., *Applicatons for the Acetoacetyl Chemistry in Thermoset Coatings*, Journal of Coatings Technology, vol. 61, No. 771 (Apr. 1989).

U.S. Federal Register, vol. 60, No. 116, pp. 31633-31637 (Jun. 16, 1995).

Wicks, Zeno W. Jr., et al., "Latexes", Organic Coatings, Science and Technology, Second Edition, (Wiley-Interscience, New York), Title Page, Copyright Page, Chapter 8, p. 143 (1999).

Dow® Z-6018 Intermediate Product Information, "Silicone Intermediates", 3 pgs., (Aug. 28, 2006).

"Ancarez AR550 Waterborne Epoxy Resin Technical Bulletin", Air Products and Chemicals, Inc., High Performance Coatings Resins, Pub. No. 125-9914, 13 pages, (Mar. 2006).

"Anquamine 401 Curing Agent Technical Bulletin", Air Products and Chemicals, Inc., Epoxy Curing Agents and Modifiers, Publication No. 125-9744,1 page, (May 2004).

"Polycat 41 Catalyst", Product Information Sheet, Air Products and Chemicals, Inc., 2 pages, (2003).

"UV Cured Undercoat Vitrecure 7", Product Data Sheet 74, Architectural & Industrial Coatings, 1 page (Dec. 21, 2004).

"UV Cured Sealer for Cement Based Substrates Vitrecure 9", Product Data Sheet 54, Architectural & Industrial Coatings, 1 page (Jul. 24, 2004).

Fox, T. G., "Influence of diluent and of copolymer composition on the glass temperature of a polymer system", Bull. Am. Phys. Soc. I (3), 123 (1956).

PQ® Potassium Silicates, PQ Corporation Brochure, (2004).

"*ASTM C920-11 Standard Specification for Elastomeric Joint Sealants*" Abstract, Book of Standards, 2 pages, (vol. Apr. 2007).

"*ASTM C834-10 Standard Specification for Latex Sealants*" Abstract, Book of Standards, 2 pages, (vol. Apr. 2007).

Epoxy Resins Chemistry and Technology 2nd Edition, Revised and Expanded—Tanaka, Yoshio: Synthesis and Characteristics of Epoxides, p. 54 (1988).

Select Committee on GRAS Substances (SCOGS) Opinion: Potassium pyrophosphate, SCOGS Report No. 32 (1975), downloaded from: fda.gov/Food/FoodIngredientsPackaging/GenerallyRecognizedasSafeGRAS/GRASSubstancesSCOGSDatabase/ucm261025.htm.

"*Status of Pesticides in Registration, Reregistration, and Special Review (aka Rainbow Report) Spring 1998*", pp. 1-66 and 318-319.

ASTM D 6944—03 Standard Test Method for Resistance of Cured Coatings to Thermal Cycling, 2008.

Koleske et al., Paint and Coatings Industry, Apr. 2003, pp. 12-86.

\* cited by examiner

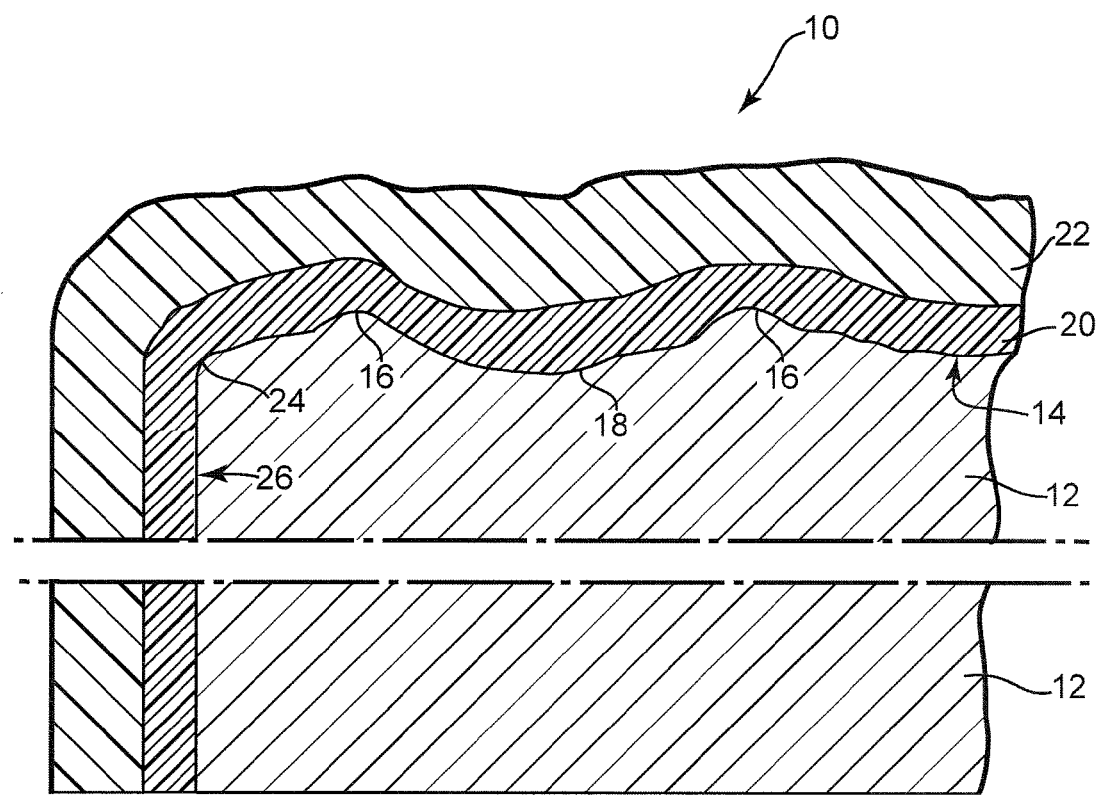

TREATMENT FOR CEMENT COMPOSITE ARTICLES

CROSS-REFERENCE TO RELATED APPLICATION

This application claims priority from U.S. provisional patent application Ser. No. 60/890,450, filed Feb. 16, 2007, the disclosure of which is incorporated herein by reference.

BACKGROUND

Fiber cement composite siding is a high quality building material having many advantages over vinyl, aluminum or wood siding. One major advantage is the significantly better durability of fiber cement siding. Fiber cement siding typically includes a substrate made from wood pulp or synthetic fiber mixed with a binder that includes silica, hydraulic cement and water. The mixture is pressed, cast, molded, roll-formed, extruded or otherwise formed into a green board form and dried. One or both major surfaces of the siding may be profiled or embossed to look like a grained or roughsawn wood or other building product, or scalloped or cut to resemble shingles. A variety of styles or shapes are available (including lap siding, vertical siding, soffit panels, trim boards, shaped edge shingle replicas and stone or stucco replicas), in a variety of sizes and thicknesses. Fiber cement siding may be prefinished (e.g., primed or painted) at the factory where it is made and delivered to a job site ready for installation (viz., attachment) on a building. The resulting prefinished siding product has a primed or painted appearance immediately upon attachment.

Unfortunately, some finishes adhere poorly to fiber cement siding products, especially near edges and corners. An applied finish may initially appear to be properly adhered but may later delaminate or otherwise prematurely fail once the product has been stored, stacked or transported, during product installation, or even after the product has been installed. While builders and homeowners desire the beauty and convenience of fiber cement siding, premature finish failure can defeat the purpose of manufacturing boards with a preapplied finish.

From the foregoing, it will be appreciated that what is needed in the art is a pre-finished fiber cement siding product with improved coating adhesion and a reduced tendency to exhibit premature finish failure, especially near edges and corners. Such siding products and methods for preparing the same are disclosed and claimed herein.

SUMMARY

The above-described finish adhesion problems may be aggravated for sawn fiber cement products, especially if the sawing process has burnished the product. For example, some conventional sealers which normally adhere well to the face of a cement board product may exhibit complete or nearly complete coating failure when applied to a burnished region of some cement board products, especially at edges and corners proximate the burnished region.

The invention provides in one aspect a method for preparing a coated article, which method comprises providing a cement fiberboard substrate having an outer surface, treating at least a portion of the outer surface with an aqueous solution comprising at least one phosphorus acid or salt of a phosphorus acid, and applying atop at least the treated outer surface one or more of a sealer, primer or topcoat.

The invention provides in another aspect a method for preparing a coated article, which method comprises providing a cement fiberboard substrate having at least one edge, treating one or more such edges with an aqueous solution comprising at least one phosphorus acid or salt of a phosphorus acid, and applying atop at least the treated edge(s) one or more of a sealer, primer or topcoat.

The invention provides in another aspect a method for preparing a coated article, which method comprises providing a cement fiberboard substrate having an outer surface, and treating at least a portion of the outer surface with a sealer, primer or topcoat comprising at least one phosphorus acid or salt of a phosphorus acid.

The invention provides in another aspect a method for preparing a coated article, which method comprises providing a cement fiberboard substrate having at least one edge, treating one or more such edges with one or more of a sealer, primer or topcoat comprising at least one phosphorus acid or salt of a phosphorus acid.

The invention provides in another aspect a coated article comprising a cement fiberboard substrate having at least one edge treated with at least one phosphorus acid or salt of a phosphorus acid and coated with one or more of a sealer, primer or topcoat or treating one or more such edges with one or more of a sealer, primer or topcoat comprising at least one phosphorus acid or salt of a phosphorus acid.

The above summary of the present invention is not intended to describe each disclosed embodiment or every implementation of the present invention. The description that follows exemplifies several illustrative embodiments. In various places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawing and the description below. Other features, objects, and advantages of the invention will be apparent from the description and drawing, and from the claims.

BRIEF DESCRIPTION OF THE DRAWING

FIG. 1 is a schematic cross-sectional view of a coated fiber cement article.

Like reference symbols in the various figures of the drawing indicate like elements. The elements in the drawing are not to scale.

DETAILED DESCRIPTION

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a coating composition that contains "an" additive means that the coating composition includes "one or more" additives.

The burnishing, e.g., of the edge, can be caused by any abrasive treatment that will cause surface heating such as sawing, sanding, grinding, and the like.

Terms of orientation such as "atop", "on", "uppermost" and the like refer to the relative position of various treatments, layers or coatings in the disclosed articles with respect to a horizontal cement fiberboard substrate but do not require that the disclosed articles should have any particular orientation in space during or after their manufacture. A coating "atop" a cement fiberboard substrate may be adjacent to the substrate or separated from the substrate by one or more intervening treatments, layers or coatings. A treatment or coating "on" a cement fiberboard substrate will unless the context indicates otherwise be adjacent to the substrate.

The term "board" refers to a generally planar component suitable for attachment to a building exterior surface, including lap siding, vertical siding, soffit panels, trim boards, shingle replicas, stone replicas and stucco replicas.

The term "burnish" and "burnishing", refer to making a surface smooth or glossy. Burnishing can be caused by any treatment that leaves the surface with a smooth or glossy appearance such as sawing, sanding, grinding, polishing and the like.

The phrase "chalk resistant" when used with respect to a coating composition means that if the coating composition is applied to and dried or otherwise hardened on a fiber cement board substrate, the coating composition will have a chalk rating not less than 5 (viz., a rating of 5 to 10), more preferably not less than 6 (viz., a rating of 6 to 10) and most preferably not less than 8 (viz., a rating of 8 to 10) when evaluated according to ASTM D 4214 Test Method A using a 5 year vertical exterior exposure in Florida.

The phrase "color change resistant" when used with respect to a coating composition means that if the coating composition is applied to and dried or otherwise hardened on a fiber cement board substrate, the coating composition will change less than 15 Macadam units, more preferably will change less than 10 Macadam units, and most preferably will change less than 8 Macadam units following a 5 year vertical exterior exposure in Florida.

The term "comprises" and variations thereof does not have a limiting meaning where such term appears in the description or claims. Thus, for example, a composition comprising a wax compound means that the composition includes one or more wax compounds.

The phrase "crack resistant" when used with respect to a coating composition means that if the coating composition is applied to and dried or otherwise hardened on a fiber cement board substrate, the coating composition will have a crack rating not less than 5 (viz., a rating of 5 to 10), more preferably not less than 6 (viz., a rating of 6 to 10) and most preferably not less than 8 (viz., a rating of 8 to 10) when evaluated according to ASTM D 661 using a 5 year vertical exterior exposure in Florida.

The phrase "flake resistant" when used with respect to a coating composition means that if the coating composition is applied to and dried or otherwise hardened on a fiber cement board substrate, the coating composition will maintain a flake rating not less than 5 (viz., a rating of 5 to 10), more preferably not less than 6 (viz., a rating of 6 to 10) and most preferably not less than 8 (viz., a rating of 8 to 10) when evaluated according to ASTM 772 using a 5 year vertical exterior exposure in Florida.

The term "functionalized" when used with respect to a latex polymer means the polymer contains additional pendant reactive chemical moieties other than carboxylic acid groups and linear, branched or ring structures containing ($CH_x$) groups where x is 0, 1, 2, or 3.

The term "gloss" when used with respect to a coating composition means the 60° measurement obtained when evaluating a smooth region of a fiber cement board major surface according to ASTM D 523.

The term "latex" when used with respect to a polymer means a dispersion or emulsion of polymer particles in water containing one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

The phrase "low VOC" when used with respect to a liquid coating composition means that the coating composition contains less than about 10 wt. % volatile organic compounds, more preferably less than about 7% volatile organic compounds, and most preferably less than about 4% volatile organic compounds based upon the total liquid coating composition weight.

The term "(meth)acrylic acid" includes either or both of acrylic acid and methacrylic acid, and the term "(meth)acrylate" includes either or both of an acrylate and a methacrylate.

The term "multistage" when used with respect to a latex polymer means the polymer was made using discrete charges of two or more monomers or was made using a continuously-varied charge of two or more monomers. Usually a multistage latex will not exhibit a single Tg inflection point as measured using DSC. For example, a DSC curve for a multistage latex made using discrete charges of two or more monomers may exhibit two or more Tg inflection points. Also, a DSC curve for a multistage latex made using a continuously-varied charge of two or more monomers may exhibit no Tg inflection points. By way of further explanation, a DSC curve for a single stage latex made using a single monomer charge or a non-varying charge of two monomers may exhibit only a single Tg inflection point. Occasionally when only one Tg inflection point is observed it may be difficult to determine whether the latex represents a multistage latex. In such cases a lower Tg inflection point may sometimes be detected on closer inspection, or the synthetic scheme used to make the latex may be examined to determine whether or not a multistage latex would be expected to be produced.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The coating systems described herein may be used in place of or in addition to coatings that may previously have been characterized as "sealers," "primers" or "topcoats." However, the disclosed coating systems may not fit neatly into any category per se and such terms should not be limiting. With that caveat in mind, the term "sealer" refers to a composition which may be applied on a bare (viz., uncoated) cement fiberboard substrate and dried or otherwise hardened to provide a coated surface having reduced porosity; the term "primer" refers to a composition which may be applied atop a cement fiberboard substrate and dried or otherwise hardened to provide a coated surface having improved ability to retain a subsequently-applied dried or hardened topcoat; and the term "topcoat" refers to a composition which when dried or otherwise hardened provides a decorative or protective outermost finish layer atop a fiber cement board which is or will be attached to a building exterior. By way of further explanation, such topcoats include paints, stains or sealers capable of withstanding extended outdoor exposure (e.g., exposure equivalent to one year of vertical south-facing Florida sunlight) without visually objectionable deterioration, but do not include sealers or primers that would not withstand extended outdoor exposure if left uncoated with a topcoat.

The terms "treating" and "treated" refer to the application of an acid or salt solution to an edge or surface of a cement fiberboard substrate such that after the solution has dried, a locally elevated concentration of the acid, salt or reaction byproduct thereof with the cement fiberboard substrate may be detected at the treated edge or surface. The thus-treated edge or surface may accordingly be distinguished from a cement fiberboard substrate that may contain nominal amounts of an acid or salt distributed evenly throughout the fiberboard binder, and from a cement fiberboard substrate bearing a coating that may contain nominal amounts of an acid or salt distributed evenly throughout the coating.

The term "unattached" when used with respect to a board means that the board has not been fastened (e.g., nailed, screwed or glued) to a building.

The term "water-dispersible" when used with respect to a polymer means a polymer which is capable of being combined by itself with water, without requiring the use of a secondary dispersing or emulsifying agent, to obtain an aqueous dispersion or emulsion of polymer particles having at least a one month shelf stability at normal storage temperatures.

The phase "weather resistant" when used with respect to a coating composition means that the coating composition is at least one or more of (and more preferably at least two or more of, yet more preferably at least three or more of and most preferably all of) chalk resistant, color change resistant, crack resistant or flake resistant when exposed outdoors.

Referring to FIG. 1, a coated article 10 of the present invention is shown in schematic cross-sectional view. Article 10 includes a cement fiberboard substrate 12. The first major surface 14 of substrate 12 may be embossed with small peaks or ridges 16 and valleys 18, e.g., so as to resemble roughsawn wood. Major surface 14 may have a variety of other surface configurations, and may resemble a variety of building materials other than roughsawn wood. A sealer layer or layers 20 of the disclosed coating system lies atop and partially penetrates surface 14, and desirably is applied to article 10 at the location where article 10 is manufactured. Sealer 20 provides a firmly-adhered base layer upon which one or more layers of topcoat 22 may be formed, and helps to reduce the amount of topcoat 22 that might otherwise be absorbed into substrate 12. Topcoat 22 desirably is both decorative and weather-resistant, and may be applied to article 10 at the location where article 10 is manufactured or after article 10 has been attached to a building or other surface. Article 10 also includes at least one edge such as edge 24 between first major surface 14 and a side surface of article 10 such as side surface 26. It will be understood by persons having ordinary skill in the art that edge 24 may have a sharp or somewhat rounded configuration but will in any event represent a transition region of relatively high curvature between major surface 14 and side surface 26. Persons having ordinary skill in the art will understand that article 10 may have elongated and generally parallel side surfaces intersected by shorter end surfaces, and that these side and end surfaces may be largely hidden when article 10 is installed, e.g., on a building. Persons having ordinary skill in the art will also understand that article 10 may have fewer or other layers than are shown in FIG. 1, and that in the interest of brevity these and other variations need not be separately shown in the Drawing. For example, in one exemplary embodiment the substrate is coated with a sealer layer and one or more topcoat layers. In another exemplary embodiment the substrate is coated with a primer layer and one or more topcoat layers. In yet another exemplary embodiment, the substrate is coated with a sealer layer, a primer layer and one or more topcoat layers. In yet another embodiment, the substrate is coated with a single layer of sealer, primer or topcoat. Preferably the various layers are selected to provide a coating system that has good adhesion to the substrate and between adjacent layers of the system.

It can be difficult to obtain adequate adhesion of coatings such as sealer 20 or topcoat 22 to edge 24 or to corners (not shown in FIG. 1) where two edges such as edge 24 meet. This difficulty can be aggravated when applying coatings to sawn fiber cement products, especially if the sawing process has burnished the product. The disclosed process can appreciably improve coating adhesion at such burnished regions and at edges and corners proximate the burnished regions. In another embodiment, the disclosed process can also improve coating adhesion on the major surface or sides of a cement fiberboard substrate. In the disclosed process, at least one edge such as edge 24 (and desirably all such edges, any corners where such edges meet, and yet more desirably the sides and one or both major faces) of the cement fiberboard substrate such as substrate 12 is or are treated with an aqueous solution containing a phosphorus acid, a salt of a phosphorus acid or mixture thereof. The applied solution preferably is at least partially dried and more preferably is dried sufficiently so that substrate 12 no longer has a wet appearance. One or more of a sealer, primer or topcoat is applied atop at least the treated region and desirably atop the sides and one or both major faces of substrate 12. The treatment may conveniently be applied to substrate 12 at the location where article 10 is manufactured or may be applied after article 10 has been attached to a building or other surface. When applied at a manufacturing location, the treatment may also be applied before or after or both before and after the article is subjected to drying (e.g., oven drying) to remove water from the binder. Normally it will be most convenient to apply the treatment after a board has been formed and before it is dried to remove water from the binder, as the drying step will also remove water from the treatment solution. The treatment may be applied using any convenient method including brushing (e.g., using a brush coater), direct roll coating, reverse roll coating, flood coating, vacuum coating, curtain coating and spraying. The various techniques each offer a unique set of advantages and disadvantages depending upon the substrate profile, morphology and tolerable application efficiencies. The treatment may be applied only to burnished regions and at least one edge proximate the burnished region (e.g., over the burnished region and about 100, 50 or 25 mm beyond that region past an edge and into an unburnished area); to all edges, sides and ends of the substrate; or to all edges, sides and ends and to at least one and if desired both major face(s) of the substrate. The concentration of acid or salt in the treatment solution may vary depending on the chosen acid or salt, and may be determined or adjusted empirically using the tape adhesion test described below. There may be an optimal concentration range below and above which reduced topcoat adhesion may be observed. For example, concentrations of about 1 to about 86, about 2 to about 75, about 5 to about 60, about 8 to about 40, or about 10 to about 30 wt. % acid or salt in water may be employed, based on the total weight of the solution. In one embodiment, the amount of acid or salt in the treatment solution is from about 1 to about 30 weight % based on the total weight of the solution.

A variety of cement fiberboard substrates may be employed in the present invention. Such substrates will usually include a composite of fibers (e.g., wood pulp, glass or polymeric fibers) and a binder that includes water, silica and hydraulic cement (e.g., Portland cement). The substrates can be made using methods such as extrusion, the Hatschek method, or other methods known in the art. See, e.g., U.S. Pat. Nos. 3,219,467, 3,781,396, 6,030,447, 6,346,146, 6,506,248, 6,635,735, 6,893,751 and 6,941,720; U.S. Patent Application Nos. 2005/0208285 A1 and 2006/0288909 A1; Australian Patent Application Nos. 198060655 A1 and 2005100347; and International Patent Application Nos. WO 98/45222 A1 and WO 01/68547 A1. The uncoated substrate surface typically contains a plurality of pores with micron- or submicron-scale cross-sectional dimensions. A variety of suitable fiber cement substrates are commercially available. For example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fiber cement. Other suitable fiber cement siding substrates include AQUAPANEL™ cement board products from Knauf USG Systems GmbH & Co. KG of Iserlohn, Germany, CEMPLANK™, CEMPANEL™ and CEMTRIM™ cement board products from Cemplank of Mission Viejo, Calif.; WEATHERBOARDS™ cement board products from CertainTeed Corporation of Valley Forge, Pa.; MAXITLE™, MAXISHAKE™ AND MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

A variety of phosphorus acids and salts of phosphorus acids may be employed in the present invention. Representative phosphorus acids include phosphoric acid ($H_3PO_4$, CAS RN 7664-38-2), phosphonic acid ($H_3PO_3$, CAS RN 13598-36-2), phosphinic acid ($H_3PO_2$, CAS RN 6303-21-5) and hypophosphoric acid ($H_2PO_3$, CAS RN 7803-60-3). Representative phosphorus acid salts include ammonium dihydrogen phosphate ($NH_4H_2PO_4$, CAS RN 7722-76-1), diammonium hydrogen phosphate (($NH_4)_2HPO_4$, CAS RN 7783-28-0), calcium dihydrogen phosphate ($Ca(H_2PO_4)_2$, CAS RN 7758-23-8), calcium monohydrogen phosphate dihydrate ($CaHPO_4.2H_2O$, CAS RN 7789-77-7), calcium phosphate tribasic ($Ca_3(PO_4)_2.H_2O$, CAS RN 7758-87-4), ferric phosphate ($FePO_4$, CAS RN 10045-86-0), lithium orthophosphate ($Li_3PO_4$, CAS RN 10377-52-3), magnesium ammonium phosphate hydrate (($NH_4)MgPO_4$, CAS RN 7785-21-9), magnesium hydrogen phosphate trihydrate ($MgHPO_4.3H_2O$, CAS RN 7757-86-0), potassium dihydrogen phosphate ($KH_2PO_4$, CAS RN 7778-77-0), dipotassium hydrogen phosphate ($K_2HPO_4$, CAS RN 7758-11-4), dipotassium hydrogen phosphate trihydrate ($K_2HPO_4.3H_2O$, CAS RN 16788-57-1), potassium orthophosphate ($K_3PO_4$, CAS RN 7778-53-2), potassium diphosphate ($K_4P_2O_7$, CAS RN 7320-34-5), sodium dihydrogen phosphate ($NaH_2PO_4$, CAS RN 7558-80-7), sodium phosphate monobasic monohydrate ($NaH_2PO_4.H_2O$, CAS RN 10049-21-5), disodium hydrogen phosphate ($Na_2HPO_4$, CAS RN 7558-79-4), disodium phosphate dibasic dodecahydrate ($Na_2HPO_4.12H_2O$, CAS RN 10039-32-4), disodium phosphate dibasic heptahydrate ($Na_2HPO_4.7H_2O$, CAS RN 7782-85-6), trisodium phosphate ($Na_3PO_4$, CAS RN 7601-54-9), sodium phosphate tribasic dodecahydrate ($Na_3PO_4.12H_2O$, CAS RN 10101-89-0), sodium metaphosphate ($NaPO_3$, CAS RN 10361-03-2), disodium pytophosphate ($Na_2H_2P_2O_7$, CAS RN 7758-16-9), tetrasodium pyrophosphate ($Na_4O_7P_2$, CAS RN 7722-88-5), sodium trimetaphosphate ($Na_3P_3O_9$, CAS RN 7785-84-4), sodium tripolyphosphate ($Na_5O_{10}P_3$, CAS RN 13573-18-7), hexasodium tetraphosphate ($Na_6O_{13}P_4$, CAS RN 14986-84-6) and sodium polymetaphosphate (CAS RN 50813-16-6). Mixtures of acids, salts or salts and acids may be employed. Acids and salts having appreciable water solubility (e.g., at least 5 wt. %, at least 10 wt. %, at least 20 wt. %, at least 50 wt. % or complete water miscibility) are preferred, as are acids and salts having low toxicity and low or moderate tendency to irritate the skin.

A variety of sealers may be employed in the present invention. Representative sealers typically will be aqueous compositions and include acrylic latex materials (for example, unpigmented or low pigment level latex solutions containing between about 2 and 50 wt. % solids) and water-dispersible materials (for example, unpigmented or low pigment level water-dispersible polyurethane solutions containing between about 2 and 50 wt. % solids). The sealer may for example provide one or more features such as improved adhesion, efflorescence blocking, water resistance or block resistance. An example of a commercially available sealer is OLYMPIC™ FC sealer (available from PPG). Other sealers include those described in U.S. Provisional Application Nos. 60/737,442 (filed Nov. 15, 2005); 60/764,044, 60/764,103, 60/764,131 and 60/764,242 (each of which was filed Jan. 31, 2006); 60/802,185 and 60/802,186 (both filed May 19, 2006); 60/810,739 (filed Jun. 2, 2006) and 60/819,505 (filed Jul. 7, 2006); those described in U.S. patent application Ser. No. 11/560,329, filed Nov. 15, 2006 and published as U.S. 2007/0110981 A1; Ser. No. 11/669,131, filed Jan. 30, 2007 and published as U.S. 2007/0259166 A1, Ser. No. 11/669,134, filed Jan. 30, 2007 and published as U.S. 2007/0259188 A1, Ser. No. 11/751,459, filed May 21, 2007 and published as U.S. 2007/0269660 A1, now U.S. Pat. No. 8,133,588; Ser. No. 11/757,916, filed Jun. 4, 2007 and published as U.S. 2007/0282046 A1, now U.S. Pat. No. 7,834,086; and Ser. No. 11/775,080, filed Jul. 7, 2007 and published as U.S. 2008/0008895 A1; and those described in PCT Application Nos. PCT/US06/60943, filed Nov. 15, 2006 and published as WO/2007/059516; also PCT/US07/02587 published as WO/2007/089807, PCT/US07/61326 published as WO/2007/090131, PCT/US07/61327 published as WO/2007/090132; and PCT/US2007/002802 published as WO/2007/089913 (each of which was filed Jan. 30, 2007). The sealer also preferably contains an adhesion-enhancing amount of a phosphorus acid or salt of a phosphorus acid, with salts of phosphorus acids being preferred and sodium or ammonium salts of phosphorus acids being especially preferred. For example, concentrations of about 0.1 to about 20, about 0.2 to about 15, about 0.3 to about 10 wt. % acid or salt may be employed, based on the total sealer weight. Addition of such an acid or salt to the sealer may provide a substantial improvement in topcoat adhesion. A recommended thickness for the sealer after it is dried or otherwise hardened is about 0.001 to about 0.3 mm.

A variety of primers may be employed in the present invention. Representative primers include acrylic latex or vinyl primers. The primer may include color pigments, if desired. Preferred primers have a measured 60° gloss value less than 15 gloss units, more preferably less than 10 gloss units, and most preferably less than 5 gloss units, and a pigment volume concentration (PVC) of at least 5%. Preferred primers also provide blocking resistance. A recommended thickness for the primer after it is dried or otherwise hardened is about 2 to 50 micrometers and more preferably about 5 to about 30 micrometers.

A variety of final topcoat compositions may be employed in the present invention. Representative topcoats are described in the above-mentioned U.S. Provisional Application Nos. 60/737,442, 60/764,044, 60/764,103, 60/764,131, 60/764,242, 60/802,185, 60/802,186, 60/810,739 and 60/819,505; in the above-mentioned U.S. patent application Ser. No. 11/560,329, published as U.S. 2007/0110981 A1; Ser. No. 11/669,131, published as U.S. 2007/0259166 A1, Ser. No. 11/669,134, published as U.S. 2007/0259188 A1, Ser. No. 11/751,459, published as U.S. 2007/0269660A1 Ser. No. 11/757,916, published as U.S. 2007/0282046; and Ser. No. 11/775,080, published as U.S. 2008/0008895 A1; and those described in the above-mentioned PCT Application Nos. PCT/US06/60943, published as WO/2007/059516; and PCT/US07/02587 published as WO/2007/089807, PCT/US07/61326 published as WO/2007/090131, PCT/US07/61327 published as WO/2007/090132; and PCT/US2007/002802 published as WO/2007/089913. The topcoat preferably includes a multistage latex polymer as described in the above-mentioned U.S. patent application Ser. No. 11/560,329 and PCT Application No. PCT/US06/60943. The topcoat typically will include a carrier (e.g., water or one or more organic solvents), may include other ingredients such as color pigments if desired, and in some embodiments could be characterized as a paint. Preferred final topcoat compositions have a measured 60° gloss value greater than 1 gloss unit, and more preferably between 5 and 30 gloss units.

A Wet Adhesion Test may be carried out as follows to evaluate adhesion of the coating system after a coated cement fiberboard substrate has been saturated with water. According to this test procedure, coated substrates (e.g., fiber cement boards) are soaked in room temperature water for at least 24 hours. After soaking, the boards are removed from the water and dried at room temperature for about 3 hours. A six-inch (15.24 cm) length of 3M HD 250 tape is applied to the surface of the board with the long axis of the tape in the direction of any embossing patterns that may be present. The tape is firmly pressed onto the board ensuring full contact. The tape is then removed by quickly pulling it off at a 90-degree angle to the board. "Wet Adhesion" performance is rated based on the percent of coating removed from the cement board. Performance is further assessed by noting where any failure occurs. For example, failure may occur between interfacial coating layers, between the coating and the surface of the board, or within the board itself. Preferred coating systems or coating compositions typically have less than 25% coating removal, preferably less than 15% coating removal, more preferably less than 10% coating removal and yet more preferably less than 5% coating removal. In addition, the failure preferably is within the board as indicated by a significant amount of fiber from the board adhering to the removed coating.

For use in extreme climates the disclosed coated articles preferably will withstand at least 30 freeze-thaw cycles when tested according to ASTM D6944-03, Test Method A. As written, this ASTM test method recites a 30-cycle sequence. However, rather than simply grade a specimen as a "pass" at the end of 30 cycles, the test desirably is lengthened to include additional cycles. More preferably, the coated articles can withstand at least 75 freeze-thaw cycles, most preferably at least 125 freeze-thaw cycles and optimally at least 175 freeze-thaw cycles.

The disclosed coating systems or coating compositions preferably have improved, viz., lower, volatile organic content (VOC). The coating systems or coating compositions desirably have a VOC of less than about 5%, based on the total weight of the coating system, preferably a VOC of less than about 2%, more preferably a VOC of less than about 0.5%.

Other optional components for use in the coating systems herein are described in Koleske et al., Paint and Coatings Industry, April, 2003, pages 12-86. Typical performance enhancing additives that may be employed include surface active agents, pigments, colorants, dyes, surfactants, dispersants, defoamers, thickeners, initiators (e.g., photoinitiators), heat stabilizers, leveling agents, coalescents, biocides, mildewcides, anti-cratering agents, curing indicators, plasticizers, fillers, sedimentation inhibitors, ultraviolet light absorbers, optical brighteners, and the like to modify properties.

The coating systems may also contain an optional coalescent and many coalescents are known in the art. The optional coalescent is preferably a low VOC coalescent such as is described in U.S. Pat. No. 6,762,230.

The coating systems may be applied by any number of application techniques including but not limited to brushing (e.g., using a brush coater), direct roll coating, reverse roll coating, flood coating, vacuum coating, curtain coating and spraying. The various techniques each offer a unique set of advantages and disadvantages depending upon the substrate profile, morphology and tolerable application efficiencies. Lower viscosities facilitate uniform film control. The applied film thickness may be controlled for example by varying the application rate. The disclosed coating systems may for example be applied to a cement fiberboard substrate by roll coating. An overall dry film thickness (DFT) of the coating system on the cement fiberboard substrate may for example be in the range of, but not limited to, about 0.04 to about 12 mil (about 0.001 to about 0.3 mm), about 0.08 to about 8 mil (about 0.002 to about 0.2 mm), more preferably about 0.16 to about 4 mil (about 0.004 to about 0.1 mm).

The invention will be described by the following non-limiting example in which all parts and percentages are by weight unless otherwise indicated.

EXAMPLE

A multistage latex polymer may be prepared from a first monomer mixture containing methyl methacrylate, butyl acrylate, dodecylmercaptan, and 3-mercaptopropionic acid and a second monomer mixture containing methyl methacrylate, butyl acrylate, 2-acetoacetoxyethylmethacrylate, styrene, and hydroxyethyl acrylate. The polymer will exhibit two distinct Tg values, namely a hard stage Tg believed to be at about 100-110° C. and a soft stage Tg believed to be at about 0-10° C., and the latex may contain about 39% solids. The resulting latex may be used as is, as a sealer for cement fiberboard substrates. However, if applied directly to the substrate, poor adhesion may be observed near burnished regions and especially near edges proximate the burnished regions. This may be demonstrated using HARDITRIM™ trim pieces (from James Hardie Building Products Inc. of Mission Viejo, Calif.) which have been cut with a saw and exhibit a burnished appearance. In a control run the sealer may be applied directly to the trim piece, dried, then overcoated with a topcoat (e.g., a multistage latex topcoat like that described in Example 10 of the above-mentioned published U.S. Patent Application No. 2007/0110981 A1). In additional runs the trim piece may be treated before application of the sealer using various aqueous solutions of phosphoric acid ($H_3PO_4$), ammonium dihydrogen phosphate ($NH_4H_2PO_4$) or sodium dihydrogen phosphate (NaH$_2$PO$_4$). The thus-treated trim pieces may then be sealed with the above-described sealer or with a sealer modified by the addition of a 30% NH$_4$H$_2$PO$_4$ or NaH$_2$PO$_4$ solution, dried, and overcoated with the multistage latex topcoat used for the control trim piece. When evaluated using the above-described Wet Adhesion Test, the major face of the control trim piece may exhibit only about 0 to 1% adhesion loss. However, the burnished portions of the control trim piece may exhibit about 65% adhesion loss. The other pretreated coated trim pieces may exhibit finish adhesion losses at the burnished portions as shown below in Tables 1 and 2. In samples having ammonium dihydrogen phosphate or sodium dihydrogen phosphate added to the sealer, the Tables also include a corresponding salt amount based on latex solids. Run Nos. 1-10 and 1-11 employ trim pieces with a greater degree of burnishing than in the other trim pieces.

TABLE 1

| Run No. | Pretreatment | % Acid or Salt in Pretreatment | Amount of 30% NH$_4$H$_2$PO$_4$ Added to Sealer (parts/100) | Corresponding % of Salt in Sealer based on Latex Solids | Burnished Region Wet Adhesion Loss, % |
|---|---|---|---|---|---|
| 1-1 | none | none | None | none | 65 |
| 1-2 | H$_3$PO$_4$ | 10 | None | none | 7 |
| 1-3 | H$_3$PO$_4$ | 10 | 2.5 | 0.44 | 6.2 |
| 1-4 | H$_3$PO$_4$ | 10 | 5 | 0.88 | 5 |
| 1-5 | H$_3$PO$_4$ | 10 | 7.5 | 1.3 | 3.8 |
| 1-6 | NH$_4$H$_2$PO$_4$ | 10 | None | none | 8.5 |
| 1-7 | NH$_4$H$_2$PO$_4$ | 10 | 2.5 | 0.44 | 3.3 |
| 1-8 | NH$_4$H$_2$PO$_4$ | 10 | 5 | 0.88 | 2.3 |
| 1-9 | NH$_4$H$_2$PO$_4$ | 10 | 7.5 | 1.3 | 2.3 |
| 1-10 | NH$_4$H$_2$PO$_4$ | 15 | None | none | 40 |
| 1-11 | NH$_4$H$_2$PO$_4$ | 15 | 7.5 | 1.3 | 8 |

TABLE 2

| Run No. | Pretreatment | % Acid or Salt in Pretreatment | Amount of 30% NaH$_2$PO$_4$ Added to Sealer (parts/100) | Corresponding % or Salt in Sealer based on Latex Solids | Burnished Region Wet Adhesion Loss, % |
|---|---|---|---|---|---|
| 2-1 | NaH$_2$PO$_4$ | 0 | 0 | 0 | 40 |
| 2-2 | NaH$_2$PO$_4$ | 0 | 3 | 0.53 | 26 |
| 2-3 | NaH$_2$PO$_4$ | 0 | 5 | 0.88 | 20.3 |
| 2-4 | NaH$_2$PO$_4$ | 0 | 10 | 1.76 | 23.3 |
| 2-5 | NaH$_2$PO$_4$ | 0 | 15 | 2.6 | 17 |
| 2-6 | NaH$_2$PO$_4$ | 15 | 3 | 0.53 | 11.8 |
| 2-7 | NaH$_2$PO$_4$ | 15 | 5 | 0.88 | 16.1 |
| 2-8 | NaH$_2$PO$_4$ | 15 | 10 | 1.76 | 15.0 |
| 2-9 | NaH$_2$PO$_4$ | 15 | 15 | 2.6 | 11.3 |
| 2-10 | NaH$_2$PO$_4$ | 10 | 0 | 0 | 19.5 |
| 2-11 | NaH$_2$PO$_4$ | 15 | 0 | 0 | 15.7 |
| 2-12 | NaH$_2$PO$_4$ | 20 | 0 | 0 | 17.5 |

All patents, patent applications and literature cited in the specification are hereby incorporated by reference in their entirety. In the case of any inconsistencies, the present disclosure, including any definitions therein will prevail. The invention has been described with reference to various specific and preferred embodiments and techniques. However, it should be understood that many variations and modifications may be made while remaining within the invention.

What is claimed is:

1. A method for preparing a coated article, which method comprises:
   providing a cement fiberboard substrate having an outer surface,
   applying directly to the cement fiberboard substrate an aqueous treatment comprising at least one phosphorus acid or salt of a phosphorus acid, and
   applying atop at least the treated substrate one or more of a sealer, primer or topcoat.

2. The method of claim 1, wherein aqueous solution is applied to an edge of the cement fiberboard substrate, and wherein the edge has a burnished surface formed by sawing or sanding.

3. The method of claim 1, further comprising the step of at least partially drying the applied aqueous treatment prior to application of the sealer, primer or topcoat.

4. The method of claim 1, wherein the phosphorus acid or salt of a phosphorus acid comprises phosphoric acid, phosphonic acid, phosphinic acid, hypophosphoric acid, ammonium dihydrogen phosphate, diammonium hydrogen phosphate, calcium dihydrogen phosphate, calcium monohydrogen phosphate, calcium phosphate tribasic, ferric phosphate, lithium orthophosphate, magnesium ammonium phosphate, magnesium hydrogen phosphate, potassium dihydrogen phosphate, dipotassium hydrogen phosphate, potassium orthophosphate, potassium diphosphate, sodium dihydrogen phosphate, disodium hydrogen phosphate, trisodium phosphate, sodium metaphosphate, disodium pytophosphate, tetrasodium pyrophosphate, sodium trimetaphosphate, sodium tripolyphosphate, hexasodium tetraphosphate and sodium polymetaphosphate and mixtures of such acids, such salts or such salts and acids.

5. The method of claim 4, wherein the salt of a phosphorus acid comprises ammonium dihydrogen phosphate, diammonium hydrogen phosphate, potassium dihydrogen phosphate, dipotassium hydrogen phosphate, potassium orthophosphate, sodium dihydrogen phosphate, disodium hydrogen phosphate, trisodium phosphate, or mixtures of such salts.

6. The method of claim 5, wherein the salt of a phosphorus acid comprises sodium dihydrogen phosphate, disodium hydrogen phosphate or a mixture thereof.

7. The method of claim 1, wherein the aqueous treatment comprises about 1 to about 30 wt. % of the salt of a phosphorus acid.

8. The method of claim 1, wherein the phosphorus acid or salt of a phosphorus acid has at least 5 wt. % water solubility.

9. The method of claim 1, wherein a sealer is applied atop at least the treated surface and the sealer comprises an aqueous composition containing between about 2 and 50 wt. % solids and comprising an acrylic latex material or water-dispersible polyurethane.

10. The method of claim 9, wherein the sealer comprises a multistage latex.

11. The method of claim 9, wherein the sealer contains sufficient phosphorus acid or salt of a phosphorus acid to provide enhanced adhesion in a Wet Adhesion Test.

12. The method of claim 9, wherein the sealer comprises about 0.3 to about 5 wt. % of the salt of a phosphorus acid.

13. The method of claim 9, wherein the dry film thickness of the sealer is about 0.001 to about 0.3 mm.

14. The method of claim 1, wherein a major surface of the cement fiberboard is treated with the aqueous treatment.

15. The method of claim 1, wherein a sealer is applied atop at least the treated substrate and the sealer comprises an aqueous coating composition comprising an acrylic latex, an aliphatic epoxy resin system and at least one phosphorus acid or salt of a phosphorus acid.

16. The method of claim 15, wherein the sealer contains, based upon non-volatile components, 20-80 wt. % latex polymer with a Tg of 5-50° C.; 5-50 wt. % aliphatic epoxy resin with an epoxy equivalent weight between 75 and 1,000; and 2-15 wt. % amine crosslinker with a reactive hydrogen equivalent weight between 20 and 500.

17. The method of claim 15, wherein the sealer contains 0.1 to 20 wt. % salt of a phosphorus acid based upon the total sealer weight.

18. A method for preparing a coated article, which method comprises:
providing a cement fiberboard substrate having an outer surface,
applying directly to the cement fiberboard substrate one or more of an aqueous treatment, sealer, primer or topcoat comprising at least one phosphorus acid or salt of a phosphorus acid.

19. The method of claim 18, wherein the treatment, sealer, primer or topcoat is applied to an edge of the cement fiberboard substrate, and wherein the edge has a burnished surface formed by sawing or sanding.

20. The method of claim 18, wherein the phosphorus acid or salt of a phosphorus acid comprises phosphoric acid, phosphonic acid, phosphinic acid, hypophosphoric acid, ammonium dihydrogen phosphate, diammonium hydrogen phosphate, calcium dihydrogen phosphate, calcium monohydrogen phosphate, calcium phosphate tribasic, ferric phosphate, lithium orthophosphate, magnesium ammonium phosphate, magnesium hydrogen orthophosphate, potassium dihydrogen phosphate, dipotassium hydrogen phosphate, potassium orthophosphate, potassium diphosphate, sodium dihydrogen phosphate, disodium hydrogen phosphate, trisodium phosphate, sodium metaphosphate, disodium pytophosphate, sodium pyrophosphate, sodium trimetaphosphate, sodium tripolyphosphate, hexasodium tetraphosphate and sodium polymetaphosphate and mixtures of such acids, such salts or such salts and acids.

21. The method of claim 20, wherein the phosphorus salt comprises, sodium dihydrogen phosphate, disodium hydrogen phosphate, trisodium phosphate, and mixtures of such salts.

22. The method of claim 18, wherein the treated substrate is coated with a sealer comprising an aqueous coating composition comprising an acrylic latex, an aliphatic epoxy resin system and at least one phosphorus acid or salt of a phosphorus acid.

23. The method of claim 22, wherein the sealer contains, based upon non-volatile components, 20-80 wt. % latex polymer with a Tg of 5-50° C.; 5-50 wt. % aliphatic epoxy resin with an epoxy equivalent weight between 75 and 1,000; and 2-15 wt. % amine crosslinker with a reactive hydrogen equivalent weight between 20 and 500.

24. The method of claim 22, wherein the sealer contains 0.1 to 20 wt. % salt of a phosphorus acid based upon the total sealer weight.

* * * * *